US012377448B2

(12) United States Patent
Harrington

(10) Patent No.: US 12,377,448 B2

(45) **Date of Patent: *Aug. 5, 2025**

(54) CLEANING DEVICES FOR CLEANING OF DIFFICULT TO REACH LOCATIONS

(71) Applicant: Unger Marketing International, LLC, Bridgeport, CT (US)

(72) Inventor: William Harrington, Charlestown, RI (US)

(73) Assignee: Unger Marketing International, LLC, Bridgeport, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,526

(22) Filed: Sep. 7, 2022

(65) Prior Publication Data

US 2022/0410224 A1 Dec. 29, 2022

Related U.S. Application Data

(63) Continuation of application No. 15/879,378, filed on Jan. 24, 2018, now Pat. No. 11,458,515.

(60) Provisional application No. 62/451,044, filed on Jan. 26, 2017.

(51) Int. Cl.

| | |
|---|---|
| ***B08B 9/043*** | (2006.01) |
| ***A47L 13/16*** | (2006.01) |
| ***A47L 13/44*** | (2006.01) |
| ***A47L 13/46*** | (2006.01) |

(52) U.S. Cl.

CPC ............ *B08B 9/0436* (2013.01); *A47L 13/16* (2013.01); *A47L 13/44* (2013.01); *A47L 13/46* (2013.01)

(58) Field of Classification Search

CPC ........ B08B 9/0436; A47L 13/16; A47L 13/44; A47L 13/46; A47L 13/10

See application file for complete search history.

(56) References Cited

U.S. PATENT DOCUMENTS

| | | | |
|---|---|---|---|
| 1,360,615 | A | 11/1920 | Bolard |
| 1,694,636 | A | 12/1928 | Barker |
| 1,977,180 | A | 10/1934 | Forbes |
| 1,982,910 | A | 12/1934 | Forbes et al. |
| 2,140,706 | A | 12/1938 | Latshaw |
| D118,714 | S | 1/1940 | Rude |

(Continued)

FOREIGN PATENT DOCUMENTS

| | | | |
|---|---|---|---|
| CA | 2519035 | A1 | 10/2006 |
| CA | 2743814 | A1 | 9/2011 |

(Continued)

OTHER PUBLICATIONS

European Office Action; International Application No. 18153646.7-1016; International Filing Date: Jan. 26, 2018; Date of Mailing: Aug. 20, 2020; 5 pages.

(Continued)

*Primary Examiner* — Alexander Markoff

(74) *Attorney, Agent, or Firm* — McCarter & English, LLP; Dave S. Christensen

(57) ABSTRACT

A cleaning device includes a handle having a longitudinal axis and a wiper connected to the handle. The wiper includes a plurality of ridges arranged along the longitudinal axis to form a hollow member. The plurality of ridges have a plurality of contact surfaces for contacting a surface to be cleaned.

20 Claims, 15 Drawing Sheets

(56) References Cited

U.S. PATENT DOCUMENTS 2,372,954 A 4/1945 Jester
D167,432 S 8/1952 Turner
2,637,537 A 5/1953 Arthur
2,707,300 A 5/1955 Angelillo
D186,902 S 12/1959 Fried
2,998,614 A 9/1961 Winch
3,058,139 A 10/1962 Eva
3,332,103 A 7/1967 Hayes
3,407,424 A 10/1968 Lanzarone et al.
3,411,723 A 11/1968 Kohn
D258,486 S 3/1981 Wallace et al.
4,328,604 A 5/1982 Adams
D274,565 S 7/1984 Smith et al.
4,520,526 A 6/1985 Peters
D281,991 S 12/1985 Solheim
D296,271 S 6/1988 Kobayashi
D298,072 S 10/1988 Stirling
4,794,663 A 1/1989 Vosbikian
4,829,621 A 5/1989 Phenegar
4,847,938 A 7/1989 Unger
5,158,532 A 10/1992 Peng et al.
5,231,322 A 7/1993 Richards et al.
5,315,732 A 5/1994 Huefner et al.
5,333,345 A 8/1994 O'Donnell
5,339,480 A 8/1994 Murg et al.
5,400,457 A 3/1995 Ridgley
5,418,999 A 5/1995 Smith
D363,340 S 10/1995 Varga
5,491,863 A 2/1996 Dunn
5,598,596 A 2/1997 Jones et al.
5,630,244 A 5/1997 Chang
D385,946 S 11/1997 Harrison et al.
5,709,003 A 1/1998 Batch
D396,910 S 8/1998 Henke
D404,114 S 1/1999 Denkewicz, Jr. et al.
5,878,459 A 3/1999 McParland
5,967,152 A 10/1999 Rimkus
6,015,293 A 1/2000 Rimkus
D423,790 S 5/2000 Solberg
6,132,126 A 10/2000 Sheffler et al.
6,134,738 A 10/2000 Weber et al.
6,154,913 A 12/2000 Burton
6,192,525 B1 * 2/2001 Tash ........................ E03C 1/308 4/255.11
6,216,283 B1 * 4/2001 Tash .......................... E03D 9/00 4/255.05
6,237,182 B1 5/2001 Cassar
6,279,189 B1 8/2001 Cassar
D449,451 S 10/2001 Petner
D469,259 S 1/2003 Vosbikian
6,530,707 B1 3/2003 Byrne et al.
6,546,588 B1 4/2003 Black
D479,024 S 8/2003 Libman
6,872,021 B1 3/2005 Wilson et al.
6,931,690 B2 8/2005 Cox
6,948,209 B2 9/2005 Chan
6,990,706 B2 1/2006 Broecker et al.
D515,758 S 2/2006 Turchi et al.
7,000,282 B2 2/2006 Cox et al.
7,017,222 B2 3/2006 Dunn
D518,949 S 4/2006 Wang
7,155,770 B2 1/2007 Anderson et al.
D542,493 S 5/2007 Berti
7,213,292 B1 5/2007 Tucker
7,334,286 B2 2/2008 Kayser
D564,161 S 3/2008 Talesfore et al.
7,343,638 B2 3/2008 Mitchell et al.
7,344,327 B2 3/2008 Gueret
7,356,869 B2 4/2008 Knopow et al.
D579,615 S 10/2008 Ames
7,574,767 B2 8/2009 Michaels et al.
7,640,617 B2 1/2010 Kennedy et al.
7,716,777 B2 5/2010 Lee
7,740,193 B2 6/2010 Soller et al.
7,745,354 B2 6/2010 Tsuchiya
7,748,074 B2 7/2010 Guizzi
7,784,141 B2 * 8/2010 Knopow ................. A47L 13/38 15/210.1
D627,532 S 11/2010 Yang et al.
D632,857 S 2/2011 Sgroi et al.
D649,287 S 11/2011 Cho
D649,314 S 11/2011 Quinlan et al.
8,046,865 B2 11/2011 Knopow et al.
8,123,712 B2 2/2012 Julius
8,136,196 B2 3/2012 Dingert
D659,195 S 5/2012 Boltz et al.
D663,530 S 7/2012 Duwa
8,321,990 B2 12/2012 Lee
8,375,500 B1 2/2013 Aguirre
D683,544 S 6/2013 Duwa
8,677,549 B2 3/2014 Fields
8,719,990 B2 5/2014 Borofsky
8,726,451 B2 5/2014 Patterson et al.
8,763,193 B1 7/2014 Thompson et al.
D715,009 S 10/2014 Curien
8,904,589 B2 12/2014 Santarsiero et al.
8,984,701 B2 3/2015 Tussy
D726,196 S 4/2015 van Os
D730,060 S 5/2015 Rennette
9,066,583 B2 6/2015 Kayser
9,113,767 B1 8/2015 Hensel
9,167,882 B2 10/2015 Stefanson et al.
D745,299 S 12/2015 Chang
D749,919 S 2/2016 Cianciolo
9,297,170 B1 3/2016 Jones
D757,443 S 5/2016 Waitesmith
9,339,104 B2 5/2016 O'Neill
9,339,164 B2 5/2016 Santarsiero et al.
9,341,364 B2 5/2016 Dennis
D773,141 S 11/2016 Chitayat et al.
D773,799 S 12/2016 Haythornthwaite
9,532,694 B1 1/2017 Shippen et al.
D779,143 S 2/2017 Sgroi, Jr. et al.
D789,074 S 6/2017 Haythornthwaite
D796,440 S 9/2017 Gzybowski
D804,770 S 12/2017 Zoubovsky
9,855,927 B2 1/2018 Heine et al.
D830,553 S 10/2018 Wall
D835,916 S 12/2018 Macca et al.
D840,207 S 2/2019 Sun et al.
10,272,667 B2 4/2019 Hoffman, Jr. et al.
D851,408 S 6/2019 Harrington
D851,409 S 6/2019 Harrington
D851,410 S 6/2019 Harrington
D852,510 S 7/2019 Harrington et al.
10,357,138 B2 7/2019 Caruso
10,455,996 B1 10/2019 Khubani et al.
10,470,638 B2 11/2019 Patterson et al.
D869,915 S 12/2019 Seeuwen et al.
10,562,173 B2 2/2020 Stewart et al.
D882,963 S 5/2020 Harrington
10,640,093 B2 5/2020 Wood et al.
10,653,288 B2 5/2020 Batchelor, Jr. et al.
10,687,680 B1 6/2020 Even
10,765,290 B2 9/2020 Kalitowski
10,881,264 B2 1/2021 Patterson et al.
D909,069 S 2/2021 Harrington
11,006,738 B2 5/2021 Harrington et al.
11,019,974 B2 6/2021 Caruso
D942,154 S 2/2022 Harrington
11,458,515 B2 * 10/2022 Harrington ............. A47L 13/10
2001/0047556 A1 12/2001 Weihrauch
2002/0148061 A1 * 10/2002 Tanaka .................... A47L 13/38 15/229.3
2003/0079278 A1 * 5/2003 Tash .......................... E03C 1/30 4/255.11
2004/0011382 A1 * 1/2004 Kingry .................. A47L 13/256 15/228
2004/0025235 A1 * 2/2004 Tash ........................ E03C 1/302 4/255.01
2004/0060577 A1 4/2004 Dunn
2004/0143923 A1 7/2004 Bensussan et al.
2004/0177863 A1 9/2004 McKay
2005/0144749 A1 7/2005 Yamada

(56) References Cited

U.S. PATENT DOCUMENTS

| | | | | |
|---|---|---|---|---|
| 2005/0158116 | A1 | 7/2005 | Belansky et al. | |
| 2005/0283933 | A1 | 12/2005 | Mitchell et al. | |
| 2006/0070198 | A1 | 4/2006 | Deroma | |
| 2006/0234899 | A1 | 10/2006 | Nekmard et al. | |
| 2007/0020020 | A1* | 1/2007 | Bobrosky | A47L 11/34 401/9 |
| 2007/0028409 | A1 | 2/2007 | Yamada | |
| 2007/0044264 | A1 | 3/2007 | Argo et al. | |
| 2007/0274762 | A1 | 11/2007 | Edwards et al. | |
| 2008/0028555 | A1 | 2/2008 | Petner et al. | |
| 2008/0028560 | A1 | 2/2008 | Policicchio | |
| 2008/0032577 | A1 | 2/2008 | Policicchio | |
| 2010/0115722 | A1 | 5/2010 | Malloy | |
| 2011/0107551 | A1 | 5/2011 | Cassar | |
| 2011/0225756 | A1 | 9/2011 | Chapman et al. | |
| 2011/0226638 | A1* | 9/2011 | Hoadley | A46B 5/0075 206/229 |
| 2012/0183344 | A1 | 7/2012 | Habinger | |
| 2013/0298342 | A1 | 11/2013 | Cassar | |
| 2014/0099154 | A1 | 4/2014 | O'Neill | |
| 2014/0137352 | A1 | 5/2014 | Golla | |
| 2016/0011380 | A1* | 1/2016 | Tourigny | G02B 6/3866 385/134 |
| 2016/0029859 | A1 | 2/2016 | Harrington | |
| 2016/0249733 | A1 | 9/2016 | Tebbe et al. | |
| 2016/0259131 | A1* | 9/2016 | Erdman | G02B 6/3849 |
| 2017/0119125 | A1 | 5/2017 | Davis | |
| 2017/0208928 | A1 | 7/2017 | Birkert et al. | |
| 2018/0084896 | A1 | 3/2018 | Redford et al. | |
| 2018/0156984 | A1* | 6/2018 | Achkir | B08B 1/006 |
| 2018/0206693 | A1 | 7/2018 | Harrington | |
| 2018/0221924 | A1* | 8/2018 | Harrington | A47L 13/44 |
| 2019/0343364 | A1 | 11/2019 | Nadeau | |
| 2020/0253433 | A1 | 8/2020 | Bussell | |
| 2021/0016429 | A1 | 1/2021 | Savard | |
| 2021/0227961 | A1 | 7/2021 | Harrington et al. | |
| 2022/0218173 | A1 | 7/2022 | Vernazza | |
| 2024/0225406 | A1 | 7/2024 | Temple et al. | |

FOREIGN PATENT DOCUMENTS

| | | | |
|---|---|---|---|
| CN | 306783811 | | 8/2021 |
| DE | 1986144 | U | 5/1968 |
| DE | 1995617 | U | 10/1968 |
| DE | 4435888 | A1 | 4/1996 |
| DE | 202013005066 | U1 | 8/2013 |
| EP | 1609565 | A1 | 12/2005 |
| EP | 1662958 | A1 | 6/2006 |
| EP | 2189093 | A2 | 5/2010 |
| EP | 2430964 | A2 | 3/2012 |
| EP | 3015039 | A1 | 5/2016 |
| EP | 3512400 | A1 | 7/2019 |
| EP | 3801166 | A1 | 4/2021 |
| FR | 2371178 | A1 | 6/1978 |
| GB | 418871 | A | 11/1934 |
| GB | 651508 | A | 4/1951 |
| JP | 62-246345 | A | 10/1987 |
| JP | 2257904 | A | 10/1990 |
| JP | 402257904 | A | 10/1990 |
| WO | 2013063568 | A1 | 5/2013 |
| WO | 2019/236910 | A1 | 12/2019 |
| WO | 2019/241894 | A1 | 12/2019 |
| WO | 2019/243459 | A1 | 12/2019 |
| WO | 2020/170146 | A1 | 8/2020 |

OTHER PUBLICATIONS

European Office Action; International Application No. 18153649.1-1016; International Filing Date: Jan. 26, 2018; Date of Mailing: Aug. 21, 2020; 6 pages.

Extended European Search Report; International Application No. 18153646.7-1018/3366184; International Filing Date: Jan. 26, 2018; Date of Mailing: Aug. 1, 2018; 7 pgs.

Extended European Search Report; International Application No. 18153649.1-1018; International Filing Date: Jan. 26, 2018; Date of Mailing: Jun. 8, 2018; 8 pgs.

U.S. Final Office Action; U.S. Appl. No. 15/879,373, filing Jan. 24, 2018; Date of Mailing: Feb. 11, 2020; 16 pages.

U.S. Final Office Action; U.S. Appl. No. 15/879,373, filed Jan. 24, 2018; Date of Mailing: Oct. 19, 2020; 8 pages.

U.S. Non-Final Office Action; U.S. Appl. No. 15/879,373, filed Jan. 24, 2018; Date of Mailing: Aug. 30, 2019; 68 pages.

U.S. Non-Final Office Action; U.S. Appl. No. 15/879,378, filed Jan. 24, 2018; Date of Mailing: Mar. 5, 2020; 28 pages.

U.S. Non-Final Office Action; U.S. Appl. No. 15/879,378, filed Jan. 24, 2018; Date of Mailing: Oct. 29, 2020; 9 pages.

U.S. NonFinal Office Action; U.S. Appl. No. 15/879,378, filed Jan. 24, 2018; Date of Mailing Jul. 7, 2021; 11 pages.

European Office Action for Application No. 22197114.6, dated Jan. 31, 2024, 6 pages.

Amazon, Unger Professional Grip Swivel Window and Glass Squeegee, 18". Retrieved online at: https://www.amazon.com/Unger-Professional-Grip-Swivel-Squeegee/dp/B01G5WNQB6?ref_=ast_sto_dp&th=1. 9 pages, (2024).

U.S. Appl. No. 15/879,373, filed Jan. 24, 2018, U.S. Pat. No. 11,006,738, Issued.

U.S. Appl. No. 17/232,850, filed Apr. 16, 2021, 2021-0227961, Published.

U.S. Appl. No. 15/879,378, filed Jan. 24, 2018, U.S. Pat. No. 11,458,515, Issued.

U.S. Appl. No. 29/634,782, filed Jan. 24, 2018, U.S. Pat. No. D851,408, Issued.

U.S. Appl. No. 29/634,783, filed Jan. 24, 2018, U.S. Pat. No. D851,409, Issued.

U.S. Appl. No. 29/634,784, filed Jan. 24, 2018, U.S. Pat. No. D851,410, Issued.

U.S. Appl. No. 29/634,786, filed Jan. 24, 2018, U.S. Pat. No. D852,510, Issued.

U.S. Appl. No. 29/657,583, filed Jul. 24, 2018, U.S. Pat. No. D882,963, Issued.

U.S. Appl. No. 29/730,385, filed Apr. 3, 2020, U.S. Pat. No. D909,069, Issued.

U.S. Appl. No. 29/761,768, filed Dec. 11, 2020, U.S. Pat. No. D942,154, Issued.

U.S. Appl. No. 29/870,558, filed Jan. 30, 2023, Pending.

U.S. Appl. No. 18/404,053, filed Jan. 4, 2024, Pending.

* cited by examiner

CLEANING DEVICES FOR CLEANING OF DIFFICULT TO REACH LOCATIONS

CROSS REFERENCE TO RELATED APPLICATIONS

This application is a continuation of U.S. Non-Provisional application Ser. No. 15/879,378 filed on Jan. 24, 2018, which claims the benefit of U.S. Provisional Application No. 62/451,044 filed on Jan. 26, 2017, the entire contents of which are incorporated by reference.

BACKGROUND

1. Field of the Invention

The present disclosure is related to cleaning devices. More particularly, the present disclosure is related to cleaning devices allowing for cleaning of difficult to reach locations.

2. Description of Related Art

Cleaning devices that have handles or pole (hereinafter "handles") and cleaning implements are known. These cleaning implements can include, but are not limited to, dusting devices, wiping devices, brushing devices, mopping devices, scraping devices, and others.

In some cleaning applications, it is desired for the cleaning device to have one or more portions resiliently flex or bend (hereinafter "flex") to allow cleaning in hard-to-reach places such as, but not limited to, the inside of food and/or drink dispensing equipment.

Accordingly, it has been determined by the present disclosure that there is a continuing need for new and improved cleaning devices.

SUMMARY

According to an embodiment, a cleaning device includes a handle having a longitudinal axis and a wiper connected to the handle. The wiper includes a plurality of ridges arranged along the longitudinal axis to form a hollow member. The plurality of ridges have a plurality of contact surfaces for contacting a surface to be cleaned.

In some embodiments either alone or together with any one or more of the aforementioned and/or after-mentioned embodiments, the plurality of ridges are oriented perpendicular to the longitudinal axis.

In some embodiments either alone or together with any one or more of the aforementioned and/or after-mentioned embodiments, the plurality of ridges are axially spaced along the longitudinal axis.

In some embodiments either alone or together with any one or more of the aforementioned and/or after-mentioned embodiments, a flexible region is arranged at an end of the wiper, the flexible region securing the wiper to the handle.

In some embodiments either alone or together with any one or more of the aforementioned and/or after-mentioned embodiments, at least one of the flexible region and the plurality of ridges are configured to flex in a direction perpendicular to the longitudinal axis.

In some embodiments either alone or together with any one or more of the aforementioned and/or after-mentioned embodiments at least one of the flexible region and the plurality of ridges is configured to resiliently elongate along the longitudinal axis and/or to resiliently compress along the longitudinal axis, and any combinations thereof.

In some embodiments either alone or together with any one or more of the aforementioned and/or after-mentioned embodiments at least one contact surface of the plurality of contact surfaces is arranged at each of the plurality of ridges.

In some embodiments either alone or together with any one or more of the aforementioned and/or after-mentioned embodiments the at least one contact surface of the plurality of contact surfaces has a flat face.

In some embodiments either alone or together with any one or more of the aforementioned and/or after-mentioned embodiments the at least one contact surface of the plurality of contact surfaces is arranged at an internal surface of the hollow member.

In some embodiments either alone or together with any one or more of the aforementioned and/or after-mentioned embodiments a distal end of the wiper is an open end.

In some embodiments either alone or together with any one or more of the aforementioned and/or after-mentioned embodiments the open end is configured to provide access to the at least one contact surface arranged at an internal surface of the hollow member.

In some embodiments either alone or together with any one or more of the aforementioned and/or after-mentioned embodiments comprising a cleaning cloth disposed on the wiper.

In some embodiments either alone or together with any one or more of the aforementioned and/or after-mentioned embodiments the cleaning cloth is made of a material selected from the group consisting of nonwoven material, cotton, polyester, nylon, microfiber, twisted loop microfiber, and any combinations thereof.

In some embodiments either alone or together with any one or more of the aforementioned and/or after-mentioned embodiments the wiper further comprises one or more features that interact with corresponding features on the cleaning cloth to secure the cleaning cloth to the wiper.

In some embodiments either alone or together with any one or more of the aforementioned and/or after-mentioned embodiments a distal end of the wiper is an open end and the cleaning cloth includes a region extendable into the open end.

In some embodiments either alone or together with any one or more of the aforementioned and/or after-mentioned embodiments the wiper is a unitary molded polymer member.

In some embodiments either alone or together with any one or more of the aforementioned and/or after-mentioned embodiments the unitary molded polymer member comprises a material selected from the group consisting of silicone, urethane, thermoplastic elastomer (TPE), thermoplastic rubber (TPR), the material having a Shore A durometer of between 20 and 100.

According to an embodiment, a method of cleaning a channel having an area at a remote end includes holding a handle of a cleaning device. The cleaning device includes a wiper having a plurality or ridges arranged along a longitudinal axis of the handle in the form of a hollow member. A distal end of the wiper has an open end. The method additionally includes inserting the wiper into the channel until the area at the remote end is received within the open end of the wiper and moving the handle to move the wiper to clean the area.

In some embodiments either alone or together with any one or more of the aforementioned and/or after-mentioned embodiments a cleaning cloth is disposed on the wiper and inserting the wiper into the channel further comprises inserting the wiper into the channel such that the area at the remote end is in contact with the cleaning cloth.

In some embodiments either alone or together with any one or more of the aforementioned and/or after-mentioned embodiments, moving the handle to move the wiper to clean the area further comprises cleaning the area with an internal surface of the wiper and cleaning the channel with an exterior surface of the wiper.

The above-described and other features and advantages of the present disclosure will be appreciated and understood by those skilled in the art from the following detailed description, drawings, and appended claims.

DETAILED DESCRIPTION

Figure 1:
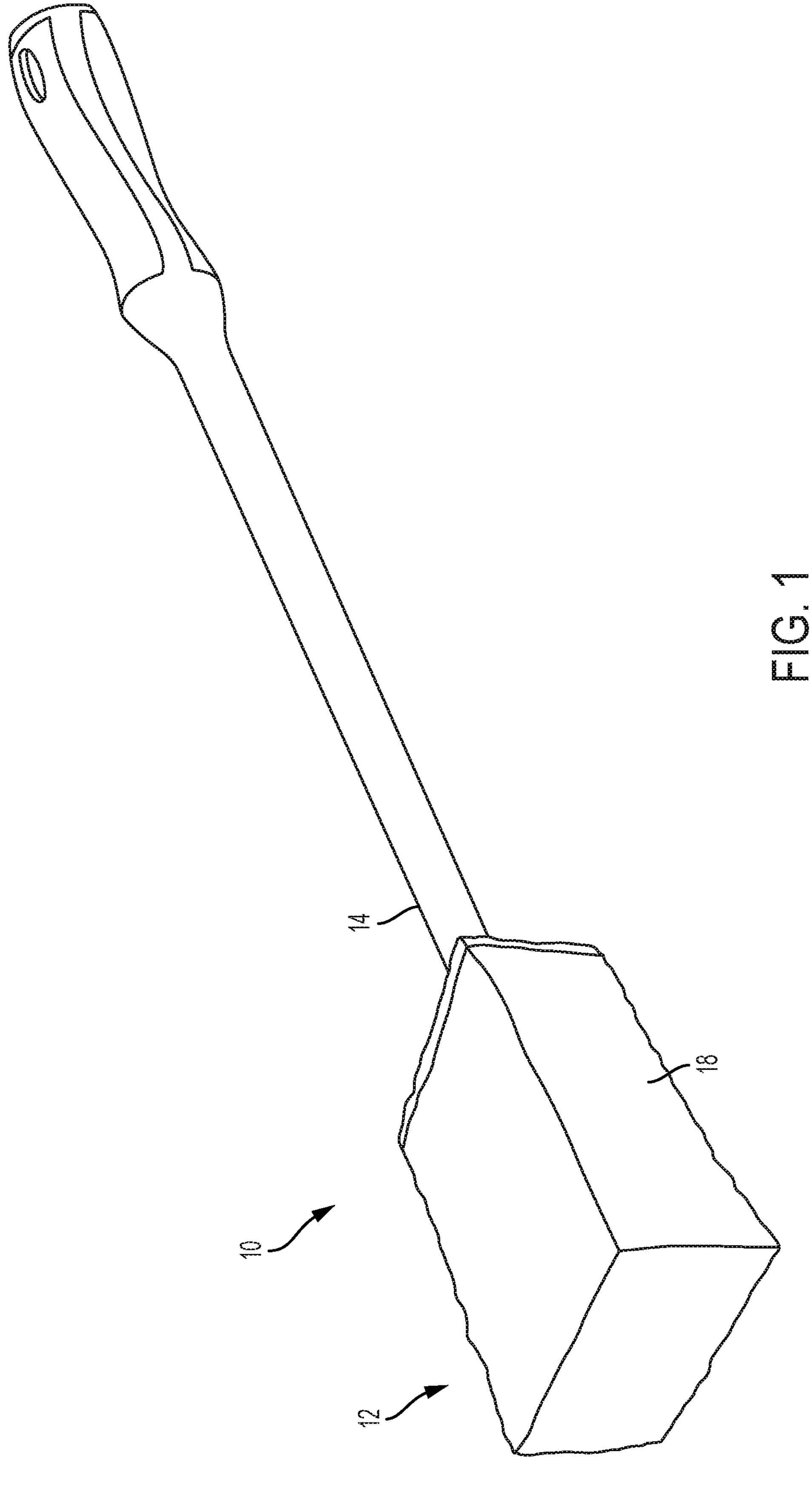
FIG. 1 is perspective view of a cleaning device according to the present disclosure.
Figure 2:
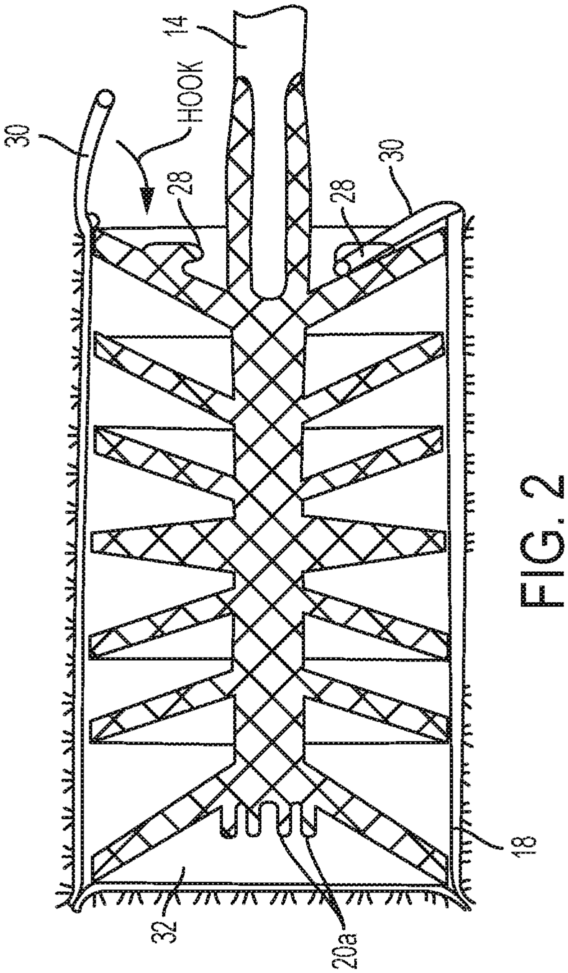
FIGS. 2 and 3 are partial sectional views of the cleaning device of FIG. 1 in various states of flexion.
Figure 3:
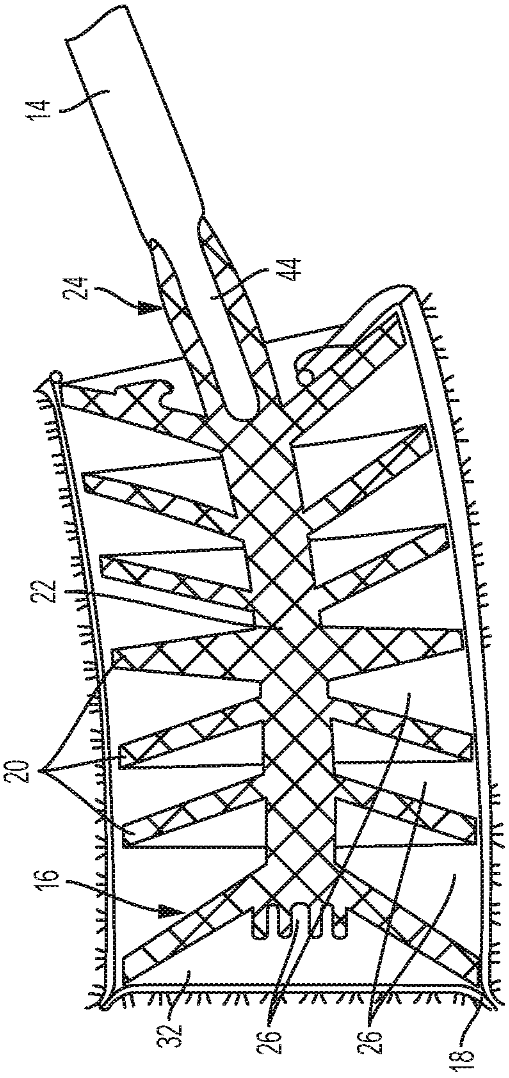

Referring now to the drawings and in particular to FIGS. 1-3, an exemplary embodiment of a cleaning device according to the present disclosure is shown and is referred to by reference numeral 10.

Device 10 includes a cleaning implement 12 and handle 14. Cleaning implement 12 includes a wiper 16 that, in some embodiments is used in combination with a cleaning cloth 18. Advantageously, device 10 is configured to allow for cleaning of hard-to-reach locations by way of wiper 16, which in some embodiments is configured to flex as shown in FIGS. 2-3.

Wiper 16 can include a plurality of ridges 20 that create multiple contact surfaces with the surface being cleaned. The contact surfaces, preferably, include a plurality of cleaning faces/edges defined by ridges 20 to enhance the cleaning efficiency of device 10.

Ridges 20 depend from a central spine 22 where the spine can include a flexible region 24 at handle 14.

For example, region 24 can be substantially as disclosed in Applicant's U.S. application Ser. No. 14/791,531, which is incorporated by reference herein—where the neck provides a first level of flexion in a first orientation, but a second, lower level of flexion in a second orientation. As used herein, the term "orientation" shall mean a degree of rotation about a longitudinal axis of handle 14. However, it is also contemplated by the present disclosure for region 24 to provide equal levels of flexion in all orientations. Here, device 10 is particularly configured to be rotated while in a flexed position, allowing region 24 to act as a universal joint during rotation.

The terms "rigid," "inflexible," "flexible," and the like are obviously terms of degree and are used herein to describe the general properties region 24.

In embodiments where region 24 allows flexion, upon application of sufficient force, in the first orientation, but resists flexion in the second orientation, the region can have a stiffness ratio of flexion in the first orientation to flexion the second orientation of between 2:1 to 100:1, more preferably between 5:1 and 50:1, with about 10:1 being most preferred.

Region 24 is, preferably, molded as a single unitary member with wiper 16 and can be secured to a rib 44 of handle 14. Rib 44 can be a portion of handle 14 that has a reduced cross section than remaining regions of the handle, allowing for flexion of the rib. Region 24 can, in some embodiments, completely encase rib 44, while in other embodiments can be disposed only on sides of the rib.

Rib 44 can have any desired cross section. For example, in some embodiments rib 44 has a rectangular cross section that allows for the first and second levels of flexion depending on the orientation, while in other embodiments the rib has a circular cross section that allows for equal levels of flexion regardless of the orientation.

Advantageously, region 24 provides, at least in part, elastomeric or resilient properties to wiper 16. Accordingly, the degree of flexibility of region 24 can be calibrated or tuned by adjusting the dimensions, shape, features, and materials of region 24, rib 44, and wiper.

It is contemplated by the present disclosure for region 24 to, in some embodiments, flex with respect to the axis of handle 14 by up to 90 degrees, more preferably up to 45 degrees. Additionally, it is contemplated by the present disclosure for region 24 to, in some embodiments, flex upon the application of a torque of between 2 and 50 inch pounds, more preferably between 5 and 10 inch pounds.

In some embodiments, ridges 20 and/or spine 22 can be flexible to provide further ability to allow for cleaning of hard-to-reach locations.

In the illustrated embodiment, at least some ridges 20 are illustrated with a positive angle with respect to a longitudinal axis of handle 14, others are illustrated with a negative angle, and still another is illustrated being perpendicular to the axis. However, it is contemplated by the present disclosure for ridges 20 to have any desired angle—and for the ridges to all have the same angle or different angles. Additionally, ridges 20 can be configured to flex and/or deform as desired.

In other embodiments, wiper 16 terminates at an open end 32, which in some embodiments has one or more ridges 20*a* therein. Open end 32 allows wiper 16 to not only use its exterior surface to clean, but also allows access to the internal surfaces 34 of the wiper—namely internal surfaces of ridges 20*a* as seen in FIGS. 2-3. In this manner, wiper 16 is configured to clean three-dimensional internal surfaces of equipment—such food and/or beverage dispensing equipment.

Figure 4:
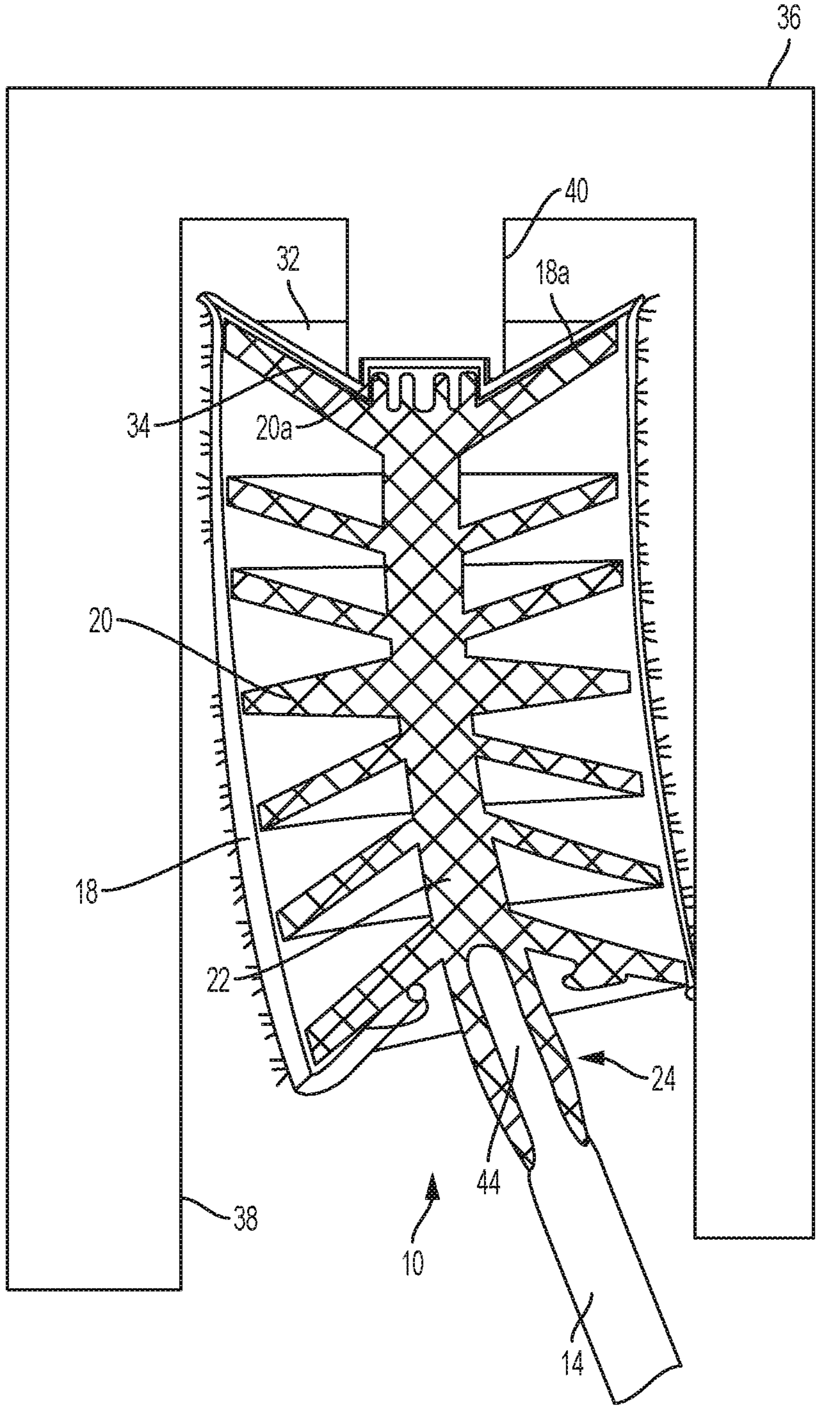
FIG. 4 is a partial sectional view of the cleaning device of FIG. 1 in use.

Referring to FIG. 4, device 10 is illustrated in use cleaning a beverage dispensing device 36 having a channel 38 and an area 40 at a remote end of the channel. For example, area 40 can be a beverage dispensing nozzle at the and channel 38 can be a beverage dispensing channel such as those present in commercially available beverage machines.

Advantageously, wiper 16 can flex at least at region 24—and in some embodiments at spine 22 and/or ridges 20—allowing handle 14 access into channel 38 while ensuring that open end 32 is aligned with area 40. Open end 32 and internal surface 34 receive area 40 and can clean the area—both its interior and exterior surfaces—with ridges 20*a* and, when present region 18*a* of cloth 18 inside of the open end. Additionally, ridges 20 and, when present, cloth 18 can clean channel 38.

The cleaning effect can occur through rotation about the axis of handle 14, by back-and-forth movement along the axis, and any combinations thereof. In some embodiments, at least one dimension is—preferably all external dimensions—of wiper 16 substantially correspond to the internal dimensions channel 38 so that wiper 16 ensures contact one or more surfaces—preferably the walls—of the channel.

Here, wiper 16 with cloth 18 thereon can have an outer dimension that is within ±0.25 inches of the internal dimensions of channel 38 so that the cloth simultaneously contacts at least two sides of channel 38, preferably at least three sides of the channel, and most preferably all four sides of the channel.

Additionally, the cleaning effect can occur through contact of cloth 18 and/or region 18*a* with channel 36 and/or area 40 so as to apply a cleaning chemical—such as, but not limited, to a disinfectant, a sanitizer, and others—to the channel and/or area.

In this manner, ridges 20 and/or spine 22 and/or region 24 can resiliently flex to conform wiper 16 to the surface being cleaned—as force is applied to handle 14 to clean difficult to reach and/or uneven surfaces. The multiple flat faces/edges provided by ridges 20 allow the user to rotate and longitudinally translate device 10 to clean surfaces of the area being cleaned.

Wiper 16 is configured to flex in directions perpendicular to the longitudinal axis of handle 14—particularly as a function of flexible region 24 and, in some embodiments, ridges 20 and/or spine 22.

In this manner, device 10 is configured to ensure receipt of area 40 in open end 32 by, for example flexing at region 24 when cleaning implement 12 is inside of channel 36.

Ridges 20 can be designed with different materials and/or thicknesses from one another and/or from the spine 22 and/or region 24 of the spine to create a desired flexion for the intended cleaning task. Further, wiper 16 can include openings 26 formed in the material to enhance flexion in desired areas. Openings 26 can also, in some embodiment, allow for cleaning fluids to drain from wiper 16 as needed.

Wiper 16 is preferably a unitary molded polymer member. In some embodiments, wiper 16 is molded polymer having a Shore A durometer of between 20 and 100, more preferably between 40 and 80. The polymer can include materials such as, but not limited to, silicone, urethane, thermoplastic elastomer (TPE), thermoplastic rubber (TPR), and others.

Wiper 16 can be used alone, or in combination with one or more cleaning cloths 18 such as, but not limited to, disposable cloths (e.g., nonwoven materials), washable textiles (e.g., cotton, polyester, nylon, microfiber, twisted loop microfiber, mesh, and others), and any combinations thereof. Cloth 18 can encase wiper 16 as shown in FIGS. 1-5.

Figure 6:
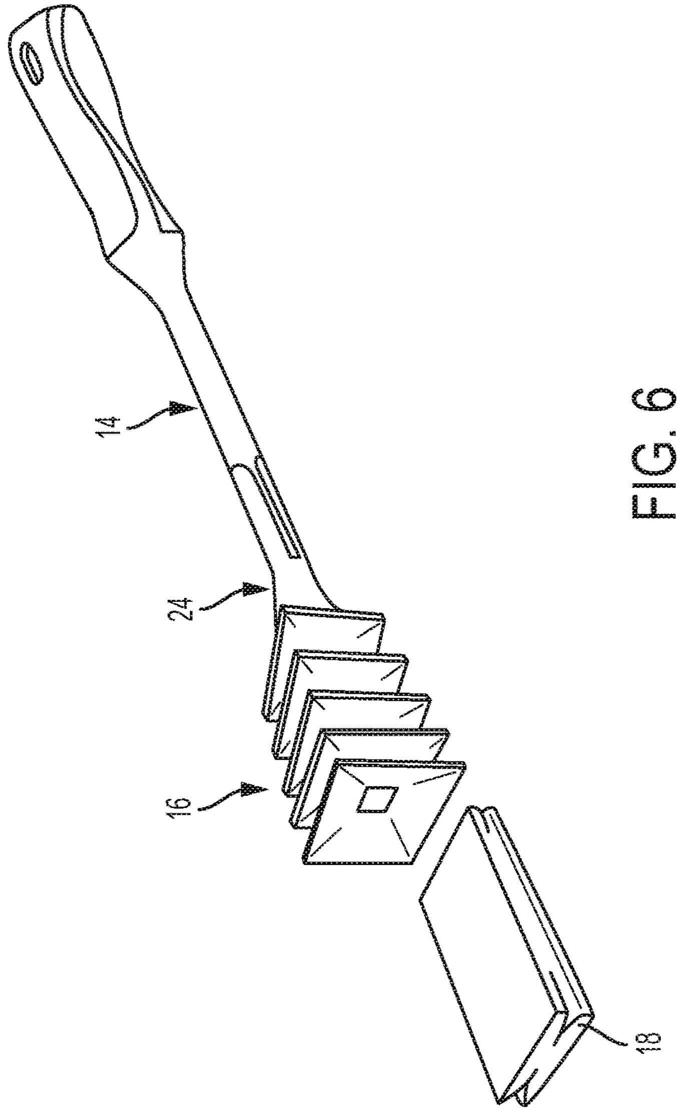
FIGS. 5 and 6 illustrate the cleaning device of FIG. 1 in use with varying cleaning cloths.
Figure 5:
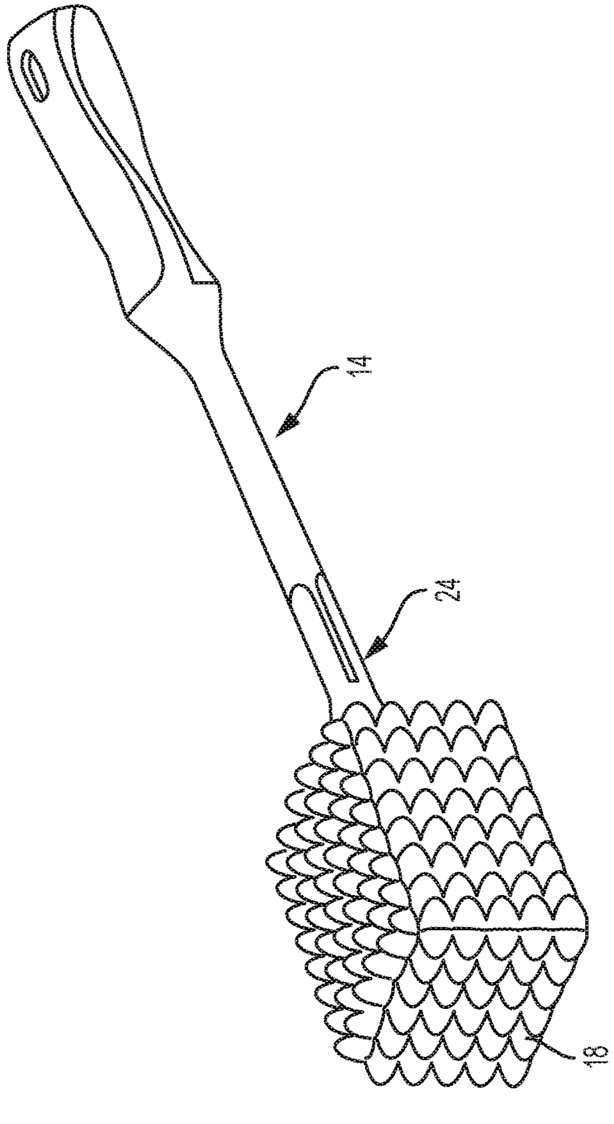

In some embodiments, cloth 18 can be a folded cloth member as in FIG. 6 that can be expanded to encase wiper 16.

In embodiments where wiper 16 is used with cloth 18, device 10 can include one or more connection devices for removably securing the wiper and cloth to one another. For example, wiper 16 can include one or more features 28 that interact with corresponding features 30 on cloth 18. For example, cloth 18 can include features 30 in the form of button holes and/or loops (elastic or inelastic) that can be selectively attached to features 28 on wiper 16.

In other embodiments, the connection devices for securing wiper 16 and cloth 18 can be formed only on the wiper or only on the cloth. In the examples illustrated in FIGS. 7-8 and 9-10, respectively, device 10 is configured with connection devices only on cloth 18.

Figure 7:
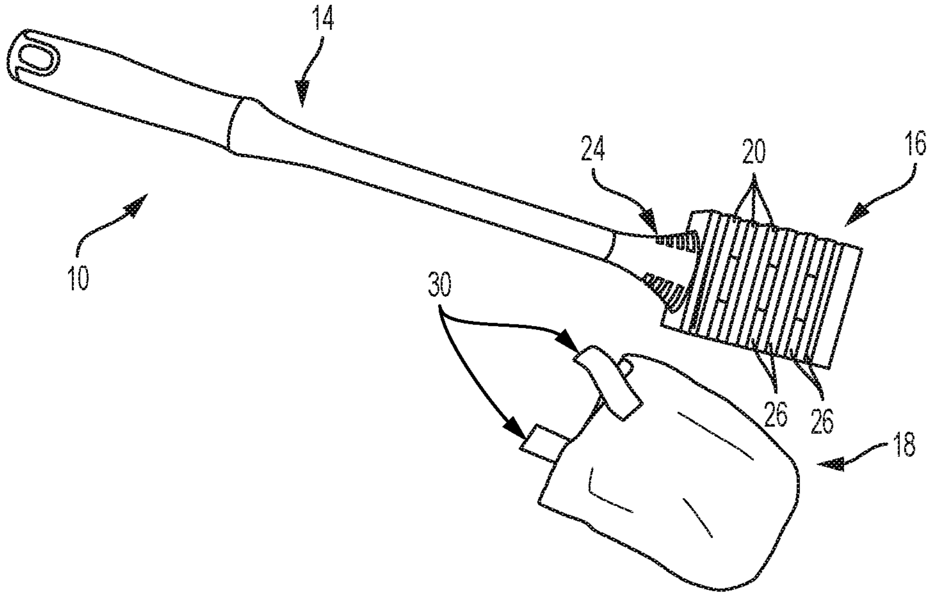
FIGS. 7 and 8 illustrate an exemplary embodiment of the cleaning device of FIG. 1 having an exemplary embodiment of a cleaning cloth before and after installation.
Figure 8:
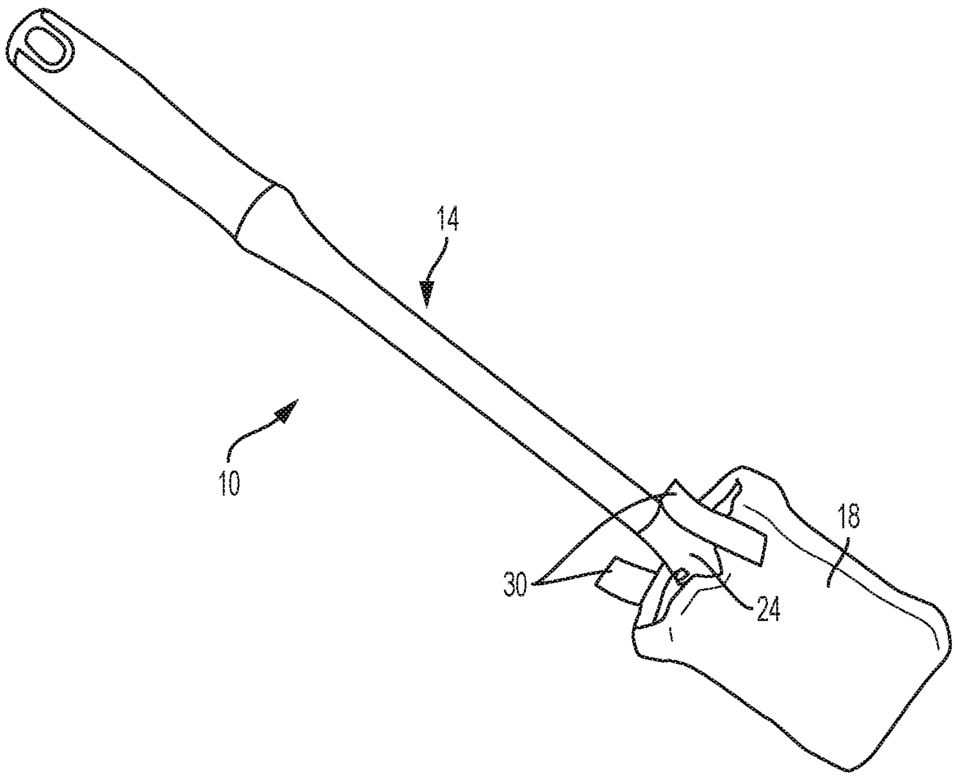

In the embodiment of FIGS. 7-8, cloth 18 includes hook-and-loop (e.g., Velcro) style connections as features 30 that are formed in a direction along the axis of handle 14. Here, cloth 18 is installed on wiper 16 and features 30 are wrapped around a rear end of the wiper.

Figure 9:
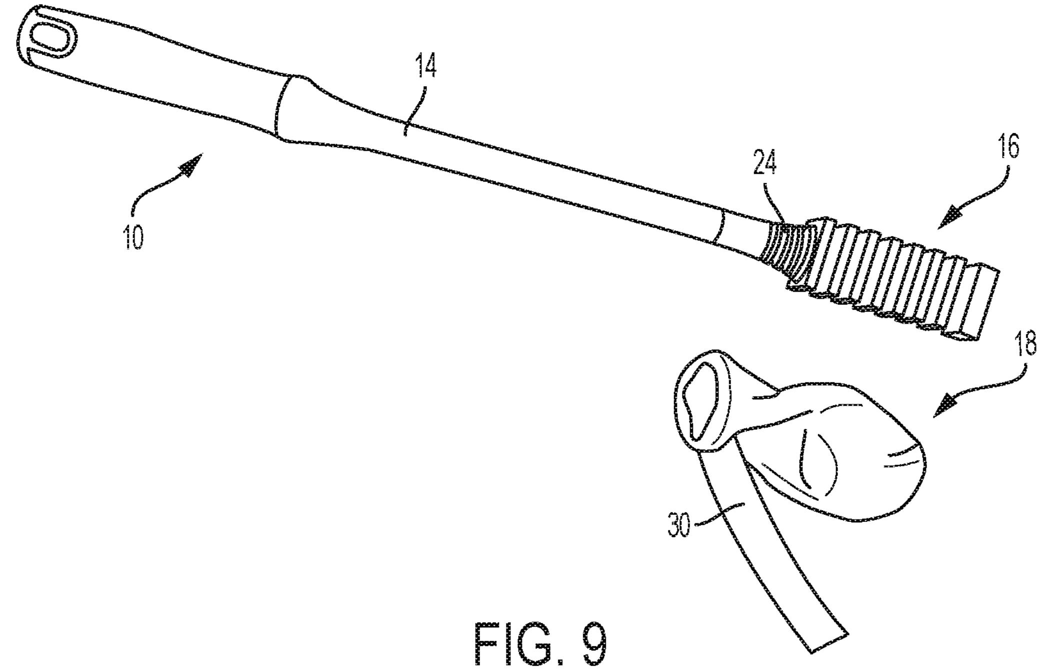
FIGS. 9 and 10 illustrate an exemplary embodiment of the cleaning device of FIG. 1 having another exemplary embodiment of a cleaning cloth before and after installation.
Figure 10:
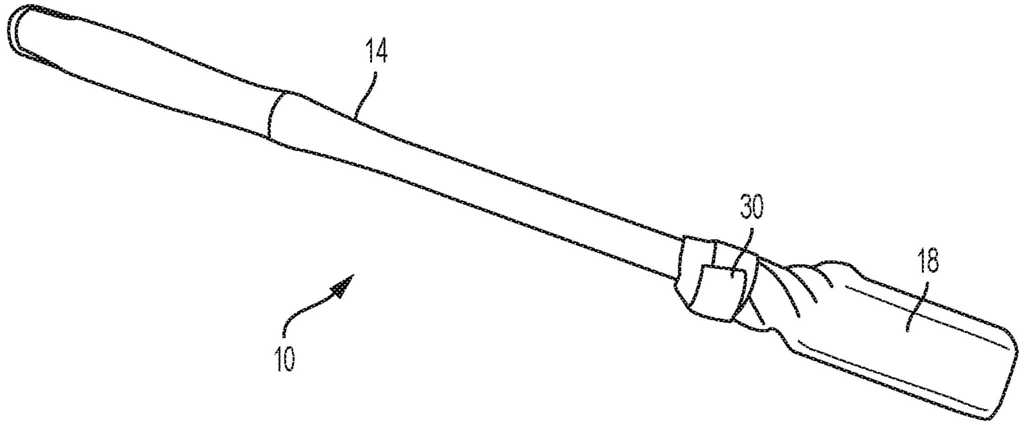
Figure 12:
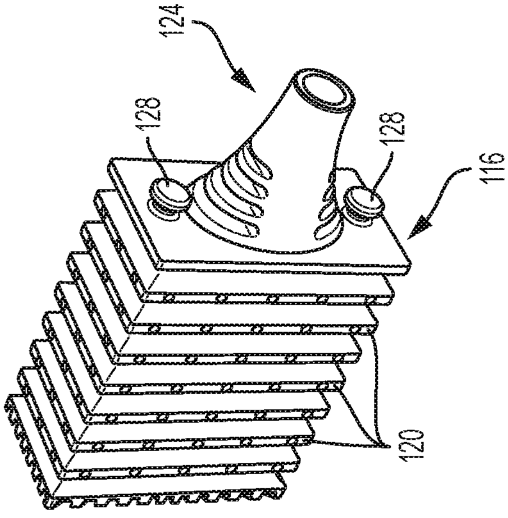
FIG. 12 is a rear perspective view of the wiper of FIG. 11.
Figure 14:
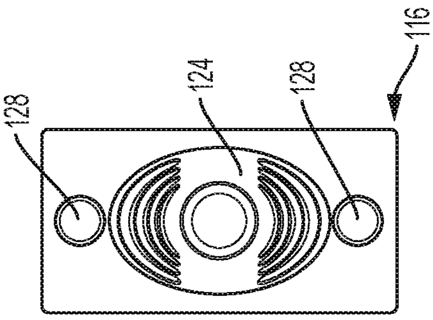
FIG. 14 is an end view of the wiper of FIG. 11.
Figure 11:
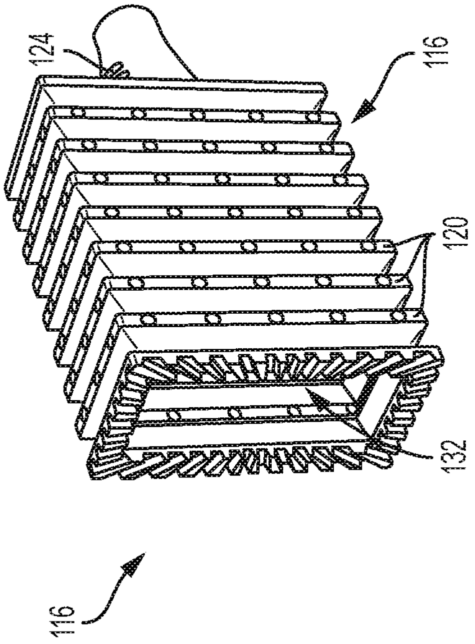
FIG. 11 is a front perspective view of an exemplary embodiment of a wiper for use with the cleaning device according to the present disclosure.
Figure 13:
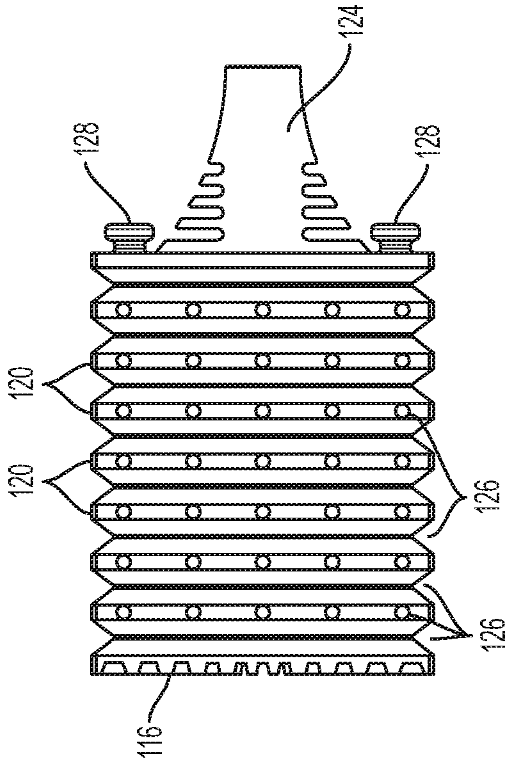
FIG. 13 is a top view of the wiper of FIG. 11.

Alternately in the embodiment of FIGS. 9-10, cloth 18 includes hook-and-loop style connections as features 30 that are formed in a direction perpendicular to the axis of handle 14. Here, cloth 18 is installed on wiper 16 and features 30 are wrapped around handle 14 and/or region 24 of the wiper and secured to itself.

It should be recognized that wiper 16 is illustrated as having a rectangular cross section. However, it is contemplated by the present disclosure for wiper 16 to have any desired cross section such as, but not limited to rectangular, square, round, oval, and others.

Accordingly, device 10 is provided with flexion—of variable levels via region 24 and, when present ridges 20 that also provide cleaning surfaces and/or spine 22—which allow the device to be particularly suited for cleaning hard to reach places.

Referring now to FIGS. 11-15, another exemplary embodiment of a wiper for use with the cleaning device 10 is shown and is referred to by reference numeral 116. Here, component parts performing similar or analogous functions are labeled in multiples of one hundred with respect to wiper 16.

Wiper 116 again has a plurality of ridges 120 that create multiple contact surfaces with the surface being cleaned. Here, ridges 120 are in the form of a hollow member that terminates at a flexible region 124 at one end and has an open end 132.

Wiper 116 is configured to flex in directions perpendicular to the longitudinal axis of handle 14 and to compress and/or elongate along the axis.

In the illustrated embodiment, ridges 120 are illustrated having both a positive angle and a negative angle with respect to a longitudinal axis of handle 114. However, it is contemplated by the present disclosure for ridges 120 to have any desired angle—and for the ridges to all have the same angle or different angles. Additionally, ridges 120 can be configured to flex and/or compress as desired.

Second region 124 is connectable to handle 14 of cleaning device 10 by any desired method such as, but not limited to, mechanical connection, adhesive connection, and others.

Region 124 and, in some embodiments, ridges 120 can resiliently flex to conform wiper 116 to the surface being cleaned—as force is applied to the handle to clean difficult to reach and/or uneven surfaces. Advantageously, the multiple flat faces/edges provided by ridges 120—both external and internal to wiper 116—allow the user to clean the area being cleaned.

Figure 15:
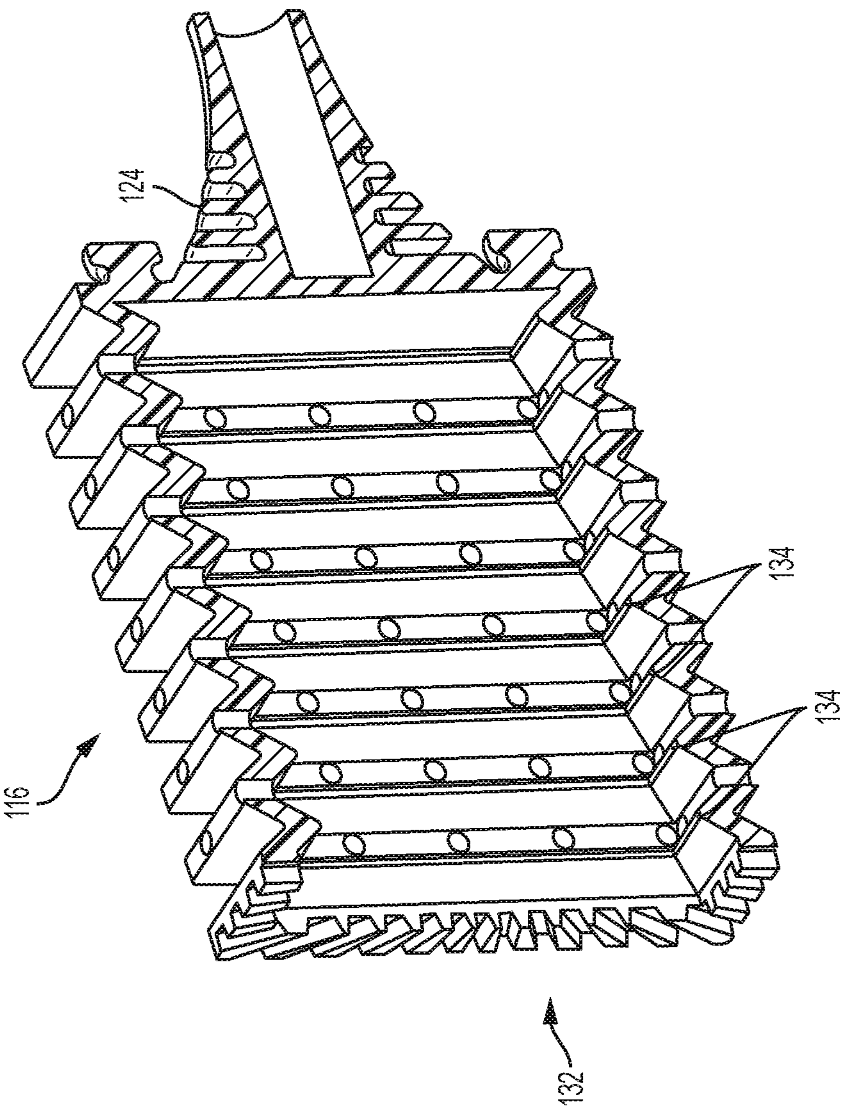
FIG. 15 is a sectional view of the wiper of FIG. 11.
Figure 16:
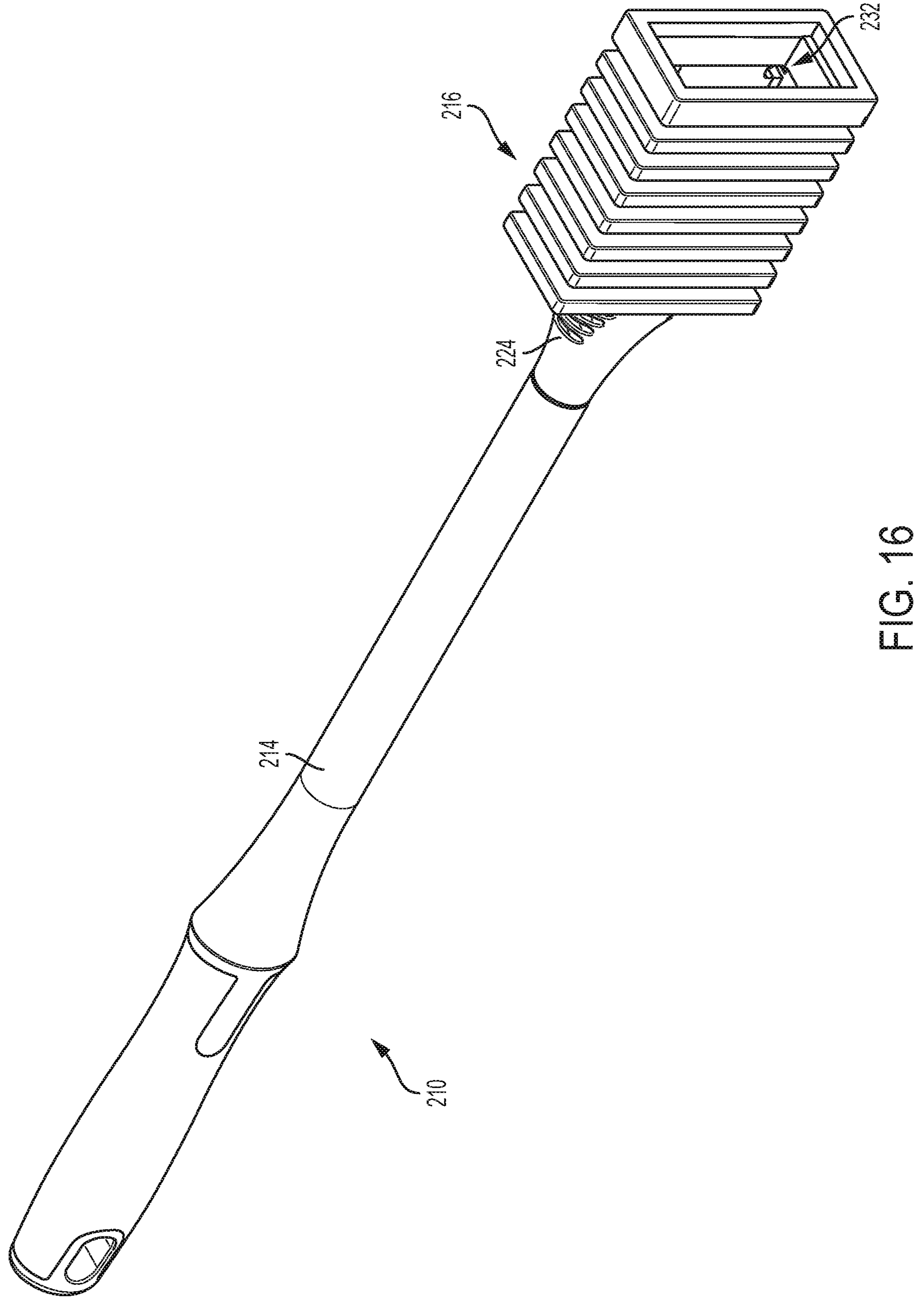
FIG. 16 is a front perspective view of another exemplary embodiment of the cleaning device according to the present disclosure.
Figure 17:
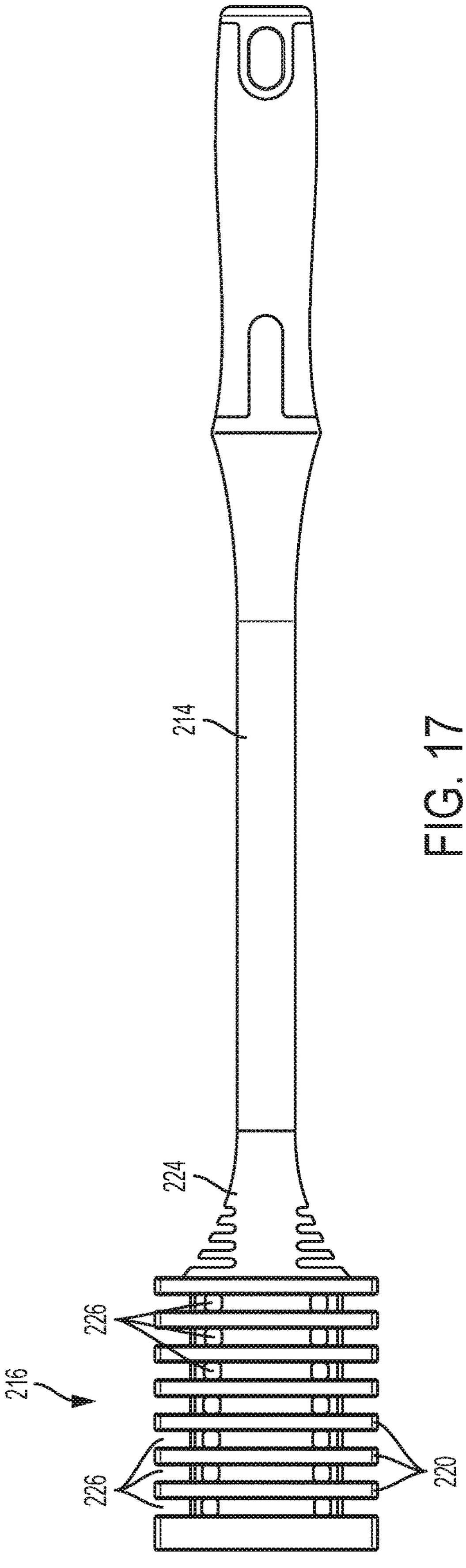
FIG. 17 is a top view of the cleaning device of FIG. 16.
Figure 18:
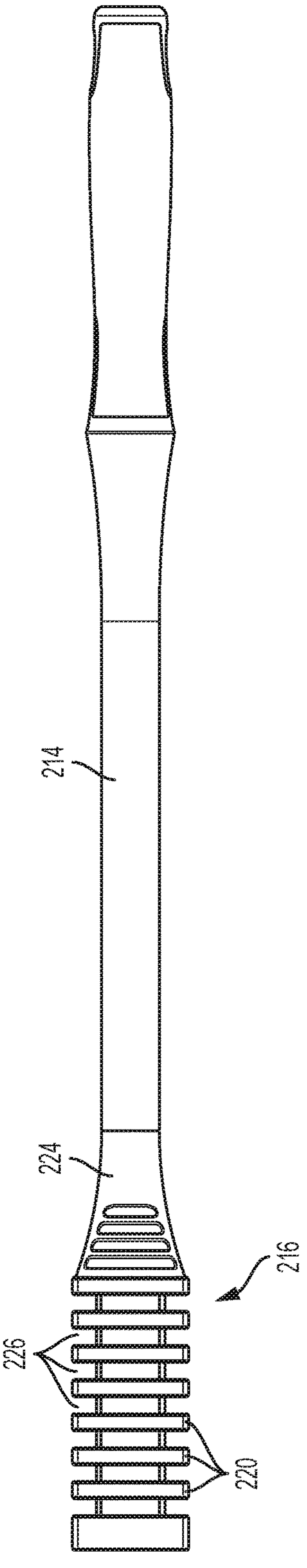
FIG. 18 is a side view of the cleaning device of FIG. 16.
Figures 19, 20:
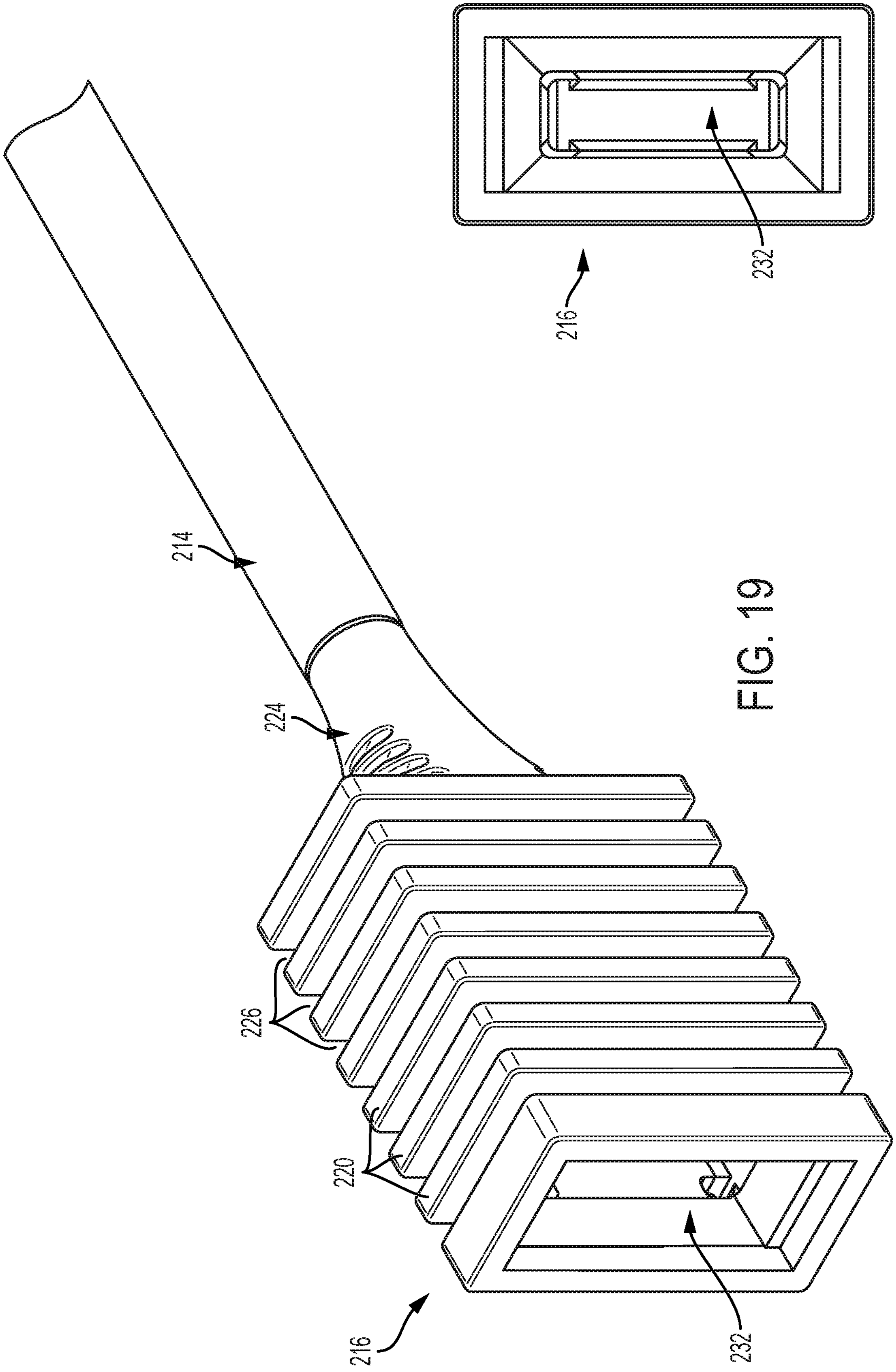
FIG. 19 is a magnified perspective view of the cleaning device of FIG. 16.
FIG. 20 is an end view of the cleaning device of FIG. 16.
Figure 21:
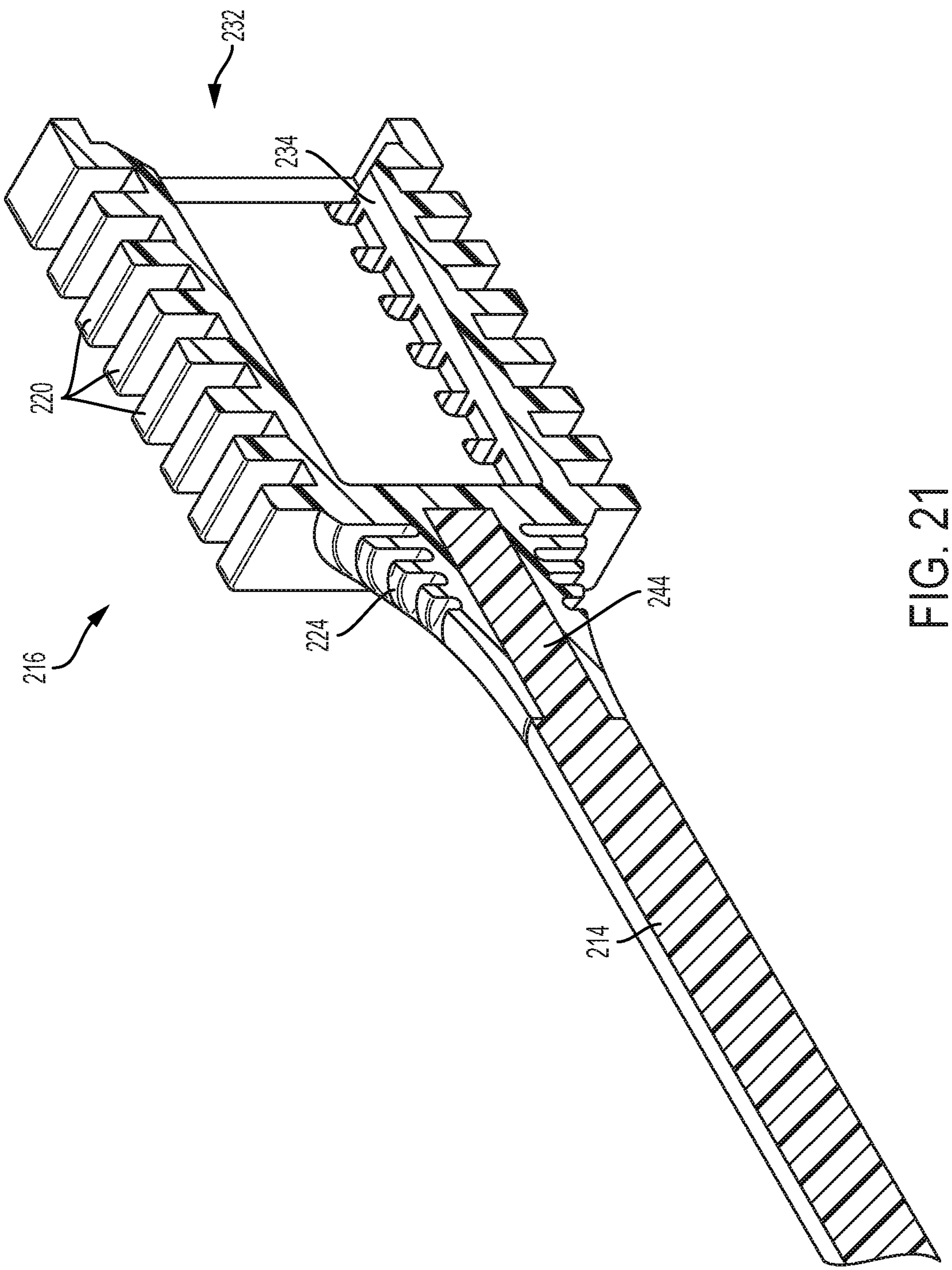
FIG. 21 is a sectional view of the cleaning device of FIG. 16.

Additionally, open end 132 allows wiper 116 to not only use its exterior surface to clean, but also allows access to the internal surfaces 134 of the wiper—namely internal surfaces of ridges 120 as seen in FIG. 15. In this manner, wiper 116 is configured to clean three-dimensional internal surfaces of equipment—such food and/or beverage dispensing equipment.

Ridges 120 can be designed with different materials and/or thicknesses from one another and/or from region 124 to create a desired flexion for the intended cleaning task. Further, wiper 116 can include openings 126 formed in the material to enhance flexion in desired areas.

Wiper 116 is preferably a unitary molded polymer member. In some embodiments, wiper 116 is molded polymer having a Shore A durometer of between 20 and 100, more preferably between 40 and 80. The polymer can include materials such as, but not limited to, silicone, urethane, thermoplastic elastomer (TPE), thermoplastic rubber (TPR), and others.

In embodiments where wiper 116 is used with cloth 18, the wiper can include one or more features 128 that interact with corresponding features 30 on cloth 18 in the manner discussed above.

Referring now to FIGS. 16-25, another exemplary embodiment of cleaning device according to the present disclosure is shown and is referred to by reference numeral 210. Here, component parts performing similar or analogous functions are labeled in multiples of two hundred with respect to device 10.

Device 210 includes a cleaning implement 212 and handle 214. Cleaning implement 212 includes a wiper 216 that, in some embodiments is used in combination with a cleaning cloth 218.

Wiper 216—much like wiper 116 discussed above—has a plurality of ridges 220 that create multiple contact surfaces with the surface being cleaned. In the illustrated embodiment, ridges 220 are illustrated as being perpendicular to a longitudinal axis of handle 214. However, it is contemplated by the present disclosure for ridges 220 to have any desired angle—and for the ridges to all have the same angle or different angles. Additionally, ridges 220 can be configured to flex and/or compress as desired.

Here, ridges 220 are in the form of a hollow member that terminates at a flexible region 224 at one end and has an open end 232.

Region 224, and in some embodiments ridges 220, can resiliently flex to conform wiper 216 to the surfaces being cleaned—as force is applied to the handle to clean difficult to reach and/or uneven surfaces. Advantageously, the multiple flat faces/edges provided by ridges 220 allow the user to clean the area being cleaned.

Wiper 216 is configured in some embodiments to flex at region 224, and in some embodiments at ridges 220, in directions perpendicular to the longitudinal axis of handle 214. In other embodiments, wiper 216 is further configured to compress and/or elongate, at region 224 and/or ridges 220, along the axis. Region 224 is, preferably, molded as a single unitary member with wiper 216 and can be secured to a rib 244 of handle 214.

Additionally, open end 232 allows wiper 216 to not only use its exterior surface to clean, but also allows access to the internal surfaces of the wiper. In this manner, wiper 216 is configured to clean three-dimensional internal surfaces of equipment—such food and/or beverage dispensing equipment.

Figure 25:
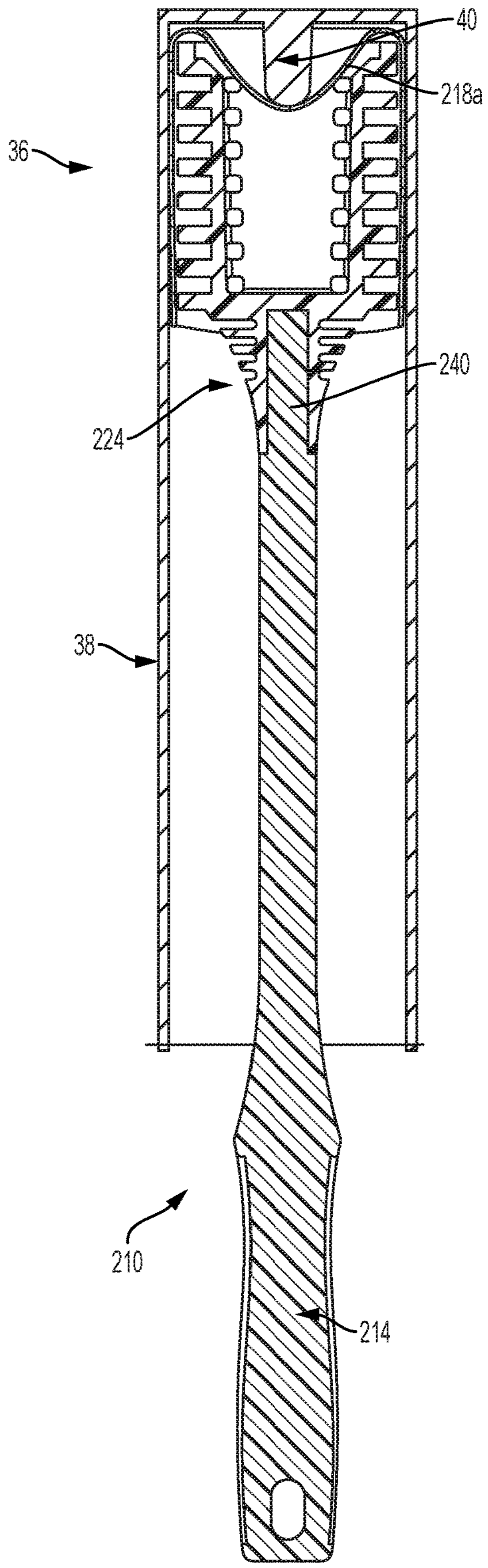
FIG. 25 is a partial sectional view of the cleaning device of FIG. 24 in use.

Referring to FIG. 25, device 210 is illustrated in use cleaning beverage dispensing device 36 having channel 38 and area 40 at a remote end of the channel. Wiper 216 can flex at least at region 224—and in some embodiments at ridges 220—allowing handle 214 access into channel 40 while ensuring that open end 232 is aligned with area 40. Open end 232 and internal surface 234 receive area 40 and can clean the area—both its interior and exterior surfaces—with surface 234 and, when present region 218*a* of cloth 218 inside of the open end. Additionally, ridges 220 and, when present, cloth 218 can clean channel 238. The cleaning effect can occur through rotation about the axis of handle 214, by back-and-forth movement along the axis, and any combinations thereof. In some embodiments, at least one dimension is—preferably all external dimensions—of wiper 216 corresponds to the internal dimensions channel 38 so that wiper 216, or cloth 218 when present, ensures contact one or more surfaces—preferably the walls—of the channel.

In the illustrated embodiment, wiper 216 has internal surface 234 with a single cleaning face/edge. However, it is contemplated by the present disclosure for internal surface 234 to have any desired number of ridges 220 forming any desired number of faces/edges.

In some embodiments, open end 232 and internal surface 234 are configured to correspond with the external dimensions of a surface being cleaned—either alone or with a portion 218*a* of cloth 218 disposed therein as discussed in more detail below.

Ridges 220 can be designed with different materials and/or thicknesses from one another and/or from region 224 to create a desired flexion for the intended cleaning task. Further, wiper 216 can include openings 226 formed in the material to enhance flexion in desired areas.

Wiper 216 is preferably a unitary molded polymer member. In some embodiments, wiper 216 is molded polymer having a Shore A durometer of between 20 and 100, more preferably between 40 and 80. The polymer can include materials such as, but not limited to, silicone, urethane, thermoplastic elastomer (TPE), thermoplastic rubber (TPR), and others.

Figure 22:
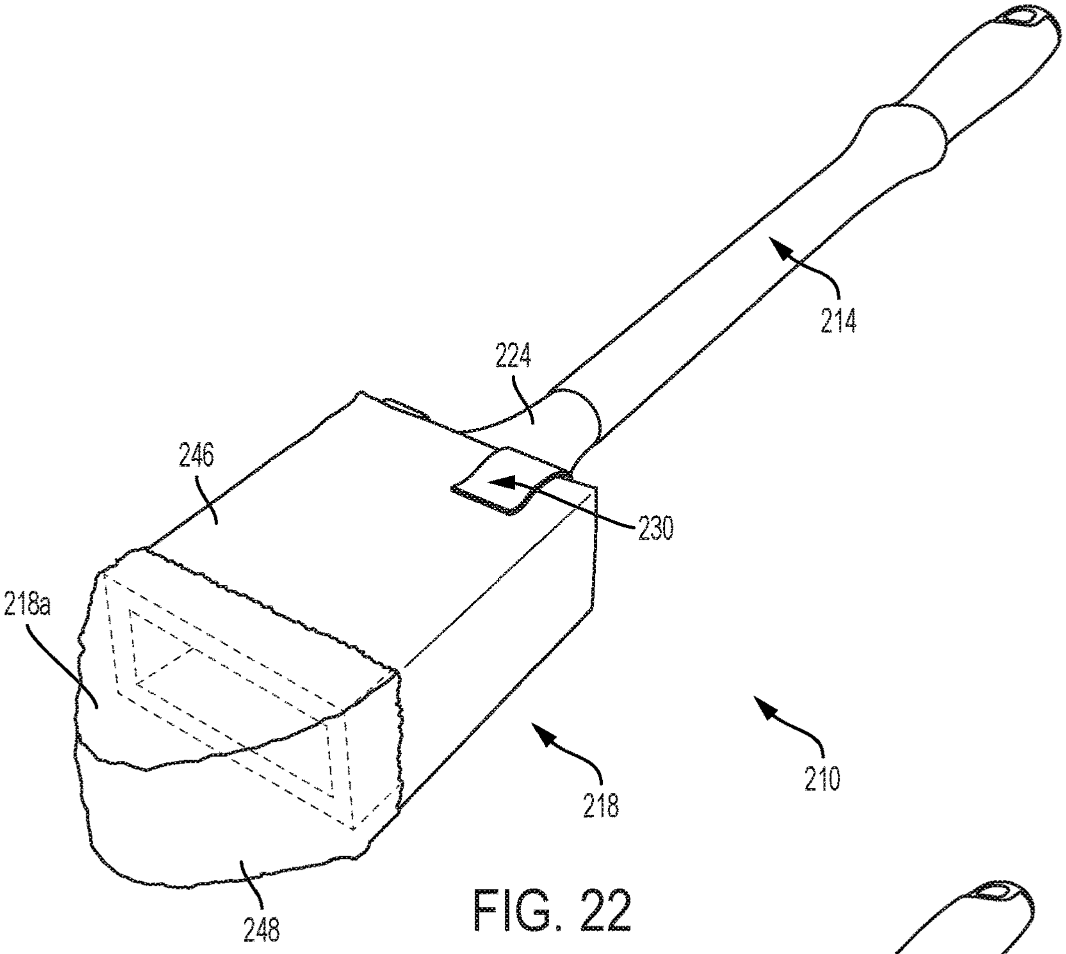
FIGS. 22 and 23 are perspective view of the cleaning device of FIG. 16 having an exemplary embodiment of a cleaning cloth during and after installation.
Figure 23:
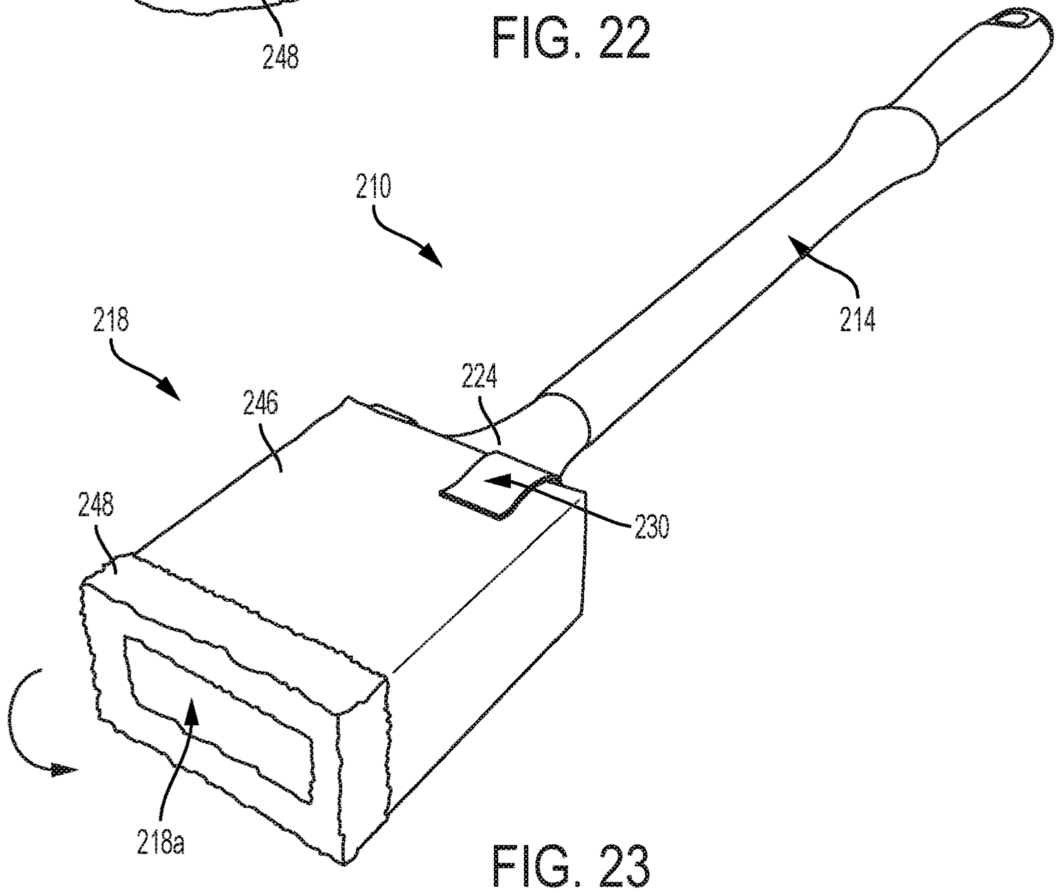
Figure 24:
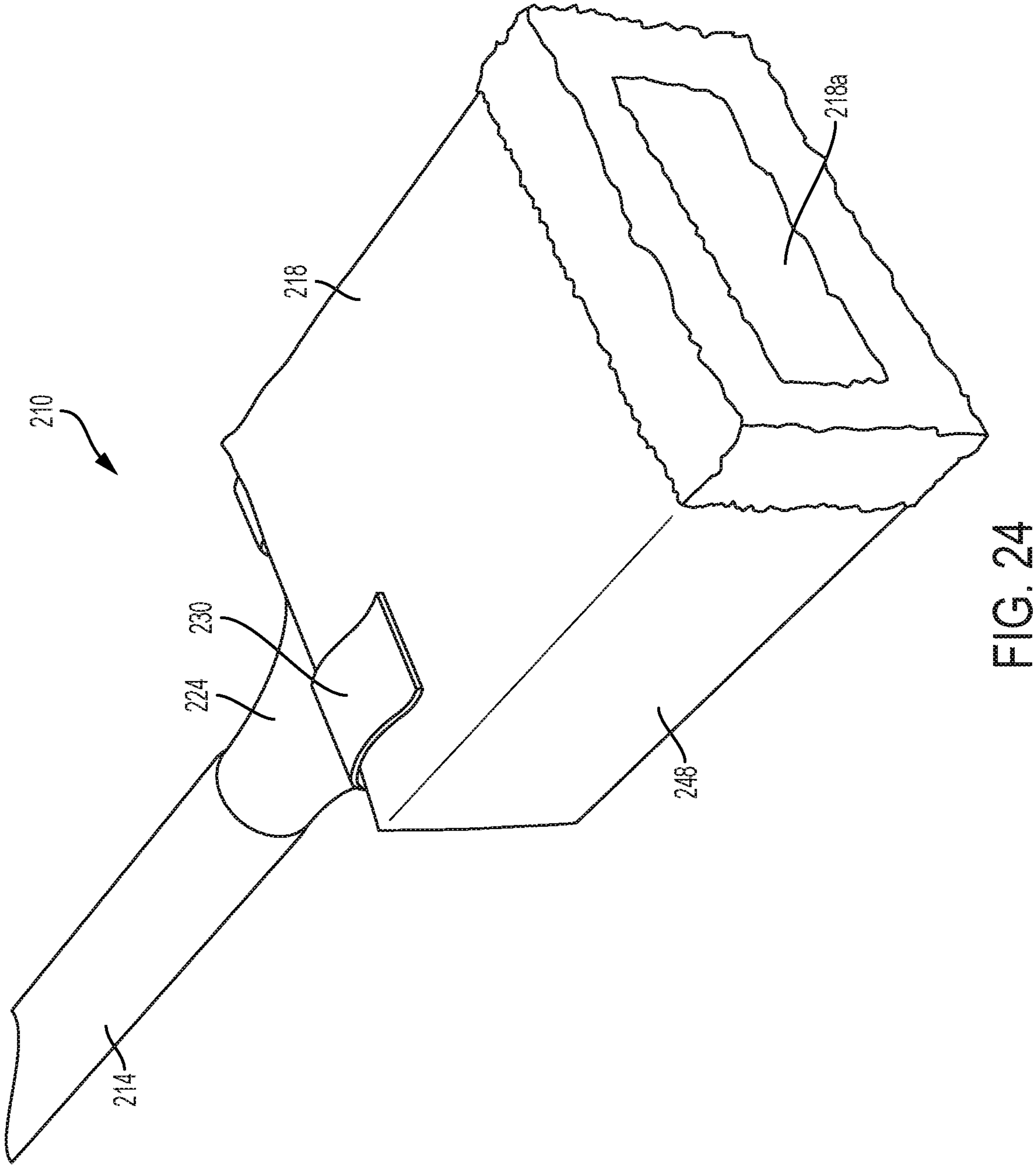
FIG. 24 is a perspective view of the cleaning device of FIG. 16 having another exemplary embodiment of a cleaning cloth disposed thereon.

As shown in FIGS. 22-24, wiper 216 can be used alone, or in combination with one or more cleaning cloths 218 having portions 218*a* that are received in open end 232 of the wiper.

In the embodiment of FIGS. 22-23, cloth 218 includes hook-and-loop style connections as features 230 that are formed in a direction along the axis of handle 214. Here, cloth 218 is installed on wiper 216 and features 230 are wrapped around a rear end of the wiper. Additionally, cloth 218 includes a portion 218*a* that is then tucked inside of wiper 218 via opening 232 (not shown) to cover the internal surfaces.

Cloth 218 is shown in FIGS. 22-23 configured for cleaning only using the internal surfaces of wiper 216. Here, cloth 218 has a mesh 246 on the exterior of wiper 216 and cleaning material 248 in region 218*a*, which is disposed in the interior of the wiper. Advantageously, cloth 218 having mesh 240 on exterior surfaces of wiper ensures that the internal surface carries cleaning chemicals to a desired location without carrying the chemicals to areas in contact with the exterior of the wiper. Moreover, mesh 240 can minimize the amount of cleaning chemicals used by avoiding absorption of the chemicals in unused regions of cloth 218.

Of course, it is contemplated by the present disclosure for cloth 218 to include cleaning material at both the exterior and interior of the wiper as shown in FIG. 24.

In some embodiments, cleaning material 242 on cloth 218—and, when present, region 218*a*, can be made of disposable cloths (e.g., nonwoven materials), washable textiles (e.g., cotton, polyester, nylon, microfiber, twisted loop microfiber, mesh, and others), and any combinations thereof.

It is contemplated by the present disclosure for wiper 16, 116, 216 to have ridges 20, 20*a*, 120, 220 only on the external surfaces, only on internal surfaces, or on combinations of the external and internal surfaces.

It should also be noted that the terms "first," "second," "third," "upper," "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A cleaning device, comprising:

a handle having a longitudinal axis;

a wiper connected to the handle, wherein the wiper includes a plurality of ridges arranged along the longitudinal axis, the plurality of ridges form a hollow member, and the plurality of ridges have a plurality of contact surfaces for contacting a surface to be cleaned; and a cleaning cloth at least partially disposed on an external surface of the wiper;

wherein the hollow member has an internal surface configured to receive at least a portion of the cleaning cloth;

wherein at least one contact surface of the plurality of contact surfaces is arranged at the internal surface of the hollow member.

2. The cleaning device of claim 1, wherein the plurality of ridges are oriented perpendicular to the longitudinal axis.

3. The cleaning device of claim 1, wherein the plurality of ridges are axially spaced along the longitudinal axis.

4. The cleaning device of claim 1, wherein a flexible region is arranged at an end of the wiper, the flexible region securing the wiper to the handle.

5. The cleaning device of claim 4, wherein at least one of the flexible region and the plurality of ridges are configured to flex in a direction perpendicular to the longitudinal axis.

6. The cleaning device of claim 4, wherein at least one of the flexible region and the plurality of ridges is configured to resiliently elongate along the longitudinal axis and/or to resiliently compress along the longitudinal axis, and any combinations thereof.

7. The cleaning device of claim 1, wherein at least one contact surface of the plurality of contact surfaces is arranged at each of the plurality of ridges.

8. The cleaning device of claim 7, wherein the at least one contact surface of the plurality of contact surfaces has a flat face.

9. The cleaning device of claim 1, further comprising one or more openings on at least one of the plurality of ridges extending between an external surface of the wiper and the internal surface of the hollow member.

10. The cleaning device of claim 1, wherein a distal end of the wiper is an open end.

11. The cleaning device of claim 10, wherein the open end is configured to provide access to the at least one contact surface arranged at the internal surface of the hollow member.

12. The cleaning device of claim 11, wherein at least a portion of the cleaning cloth is received in the open end and is disposed on the at least one contact surface arranged at the internal surface of the hollow member.

13. The cleaning device of claim 1, wherein the cleaning cloth is made of a material selected from a nonwoven material, cotton, polyester, nylon, microfiber, twisted loop microfiber, and any combinations thereof.

14. The cleaning device of claim 1, wherein the wiper further comprises one or more features that interact with corresponding features on the cleaning cloth to secure the cleaning cloth to the wiper.

15. The cleaning device of claim 1, wherein a distal end of the wiper is an open end and the cleaning cloth includes a region extendable into the open end.

16. The cleaning device of claim 1, wherein the wiper is a unitary molded polymer member.

17. The cleaning device of claim 16, wherein the unitary molded polymer member comprises a material selected from a silicone, urethane, thermoplastic elastomer (TPE), thermoplastic rubber (TPR), the material having a Shore A durometer hardness of between 20 and 100.

18. A method of cleaning a channel having an area at a remote end, the method comprising:

holding a handle of a cleaning device, the cleaning device having a wiper, the wiper having a plurality of ridges arranged along a longitudinal axis of the handle, the plurality of ridges form a hollow member, a distal end of the wiper having an open end, a cleaning cloth is at least partially disposed on an external surface of the wiper, the hollow member has an internal surface configured to receive at least a portion of the cleaning cloth;

inserting the wiper into the channel until the area at the remote end is received within the open end of the wiper and the area at the remote end is in contact with the cleaning cloth; and moving the handle to move the wiper to clean the area.

19. The method of claim 18, wherein at least a portion of the cleaning cloth is received in the open end.

20. The method of claim 18, wherein moving the handle to move the wiper to clean the area further comprises cleaning the area with an internal surface of the wiper and cleaning the channel with an exterior surface of the wiper.

* * * * *